INVENTOR.
CLEON D. O'NEAL
BY
Brown, Denk & Synnestvedt
AGENTS.

Aug. 21, 1956 C. D. O'NEAL 2,759,732

PHONOGRAPH STYLUS

Filed July 14, 1950 3 Sheets-Sheet 2

INVENTOR.
CLEON D. O'NEAL
BY
Brown, Denk & Synnestvedt
AGENTS

Aug. 21, 1956 C. D. O'NEAL 2,759,732

PHONOGRAPH STYLUS

Filed July 14, 1950 3 Sheets-Sheet 3

INVENTOR.
CLEON D. O'NEAL
BY
Brown, Denk & Synnestvedt
AGENTS

United States Patent Office 2,759,732
Patented Aug. 21, 1956

2,759,732

PHONOGRAPH STYLUS

Cleon D. O'Neal, Glenside, Pa., assignor to Philco Corporation, Philadelphia, Pa., a corporation of Pennsylvania Application July 14, 1950, Serial No. 173,791
11 Claims. (Cl. 274—38)

The present invention relates to phonograph styli. More specifically, the invention has to do with an improved reproducing stylus for phonographs adapted to play records having grooves of different dimensions. While of broader applicability, the invention is particularly concerned with the provision of a stylus capable of playing the two currently available types of records which have become known as "standard records" and as "microgroove records," respectively.

According to generally accepted specifications, standard records are provided with a groove having a width of the order of 0.006 inch at the surface of the record and a bottom radius of approximately 0.002 inch, and microgroove records are provided with a groove having a width of the order of 0.003 inch at the surface of the record and a bottom radius of approximately 0.0002 inch. The groove of both types of records is generally V-shaped and the rounded surface defined by the bottom radius of the groove is tangent to the slanting walls of the groove, which walls are at an angle of approximately 90° to each other. It will be apparent that the width, radius and wall angle of the groove determine its depth which is about 0.0021 inch for the groove of standard records, and about 0.00125 inch for the groove of microgroove records.

Because of the marked difference between the groove of standard records and the groove of microgroove records, the usual reproducing stylus tip adapted to play records of one type cannot be effectively used to play records of the other type. For that reason, it has been customary to provide the phonograph instrument with a reproducing device supplied with two separate styli, one stylus having a tip with a radius of about 0.003 inch to play standard records, the other stylus having a tip with a radius of about 0.001 inch to play microgroove records. However, the use of two separate styli is inconvenient in that it necessitates manual adjustment of the reproducer so as selectively to place the proper stylus in operative position for engagement with the particular type of record to be played.

To overcome this inconvenience, it has been proposed to design a reproducing stylus provided with a tip having a radius of the order of 0.002 inch so as to fit within the groove of microgroove records as well as within the groove of standard records. Stylus tips of that dimension are objectionable, because, when playing a standard record, the tip rides the bottom of the groove with the result that unacceptable distortions are produced, and when playing a microgroove record, the tip barely enters the groove so that tracking becomes a constant source of trouble.

As a substitute for this objectionable stylus tip, it has been suggested to provide a flattened tip, the edge surface of which is rounded on a small radius of about 0.0005 inch. In theory, such a stylus tip should be satisfactory because the flatness of tip surface keeps it away from the bottom of the groove of standard records, and the smallness of the rounded edge of said flattened surface allows the tip to sit well within the groove of microgroove records. However, in practice, the flattened rounded stylus tip has met with unfavorable results arising from the fact that, due to the small radius of the rounded edge surface of the tip, the unit pressure at the point of contact with the record groove, is very high so that said rounded surface wears out exceedingly fast. As a consequence, after an extremely short period of use, the stylus tip is no longer kept out of contact with the bottom of the groove of standard records.

Another attempt to solve the difficulty has been to design the stylus tip in the shape of a cone having a wide angle, that is, an angle exceeding 100°. Such a wide conical stylus tip rides the top edges of either the groove of standard records or the groove of microgroove records. Although the wide-angle tip does away with certain objections to the 0.002 inch radius tip and to the flattened tip, it is still subject to certain undesirable features. As hereinbefore indicated, in order to insure undistorted reproduction, it is important that the stylus tip be kept away from the bottom of the groove. To obtain this result, it is necessary that the angle of the wide-angle stylus tip be increased to about 118°. Since an increase in the cone angle brings about a reduction in the traction ability of the stylus in engagement with the modulated groove, the likelihood of mistracking is enhanced, particularly with present day pickups which are designed to operate at exceedingly light pressure, that is, a pressure not exceeding 10 grams. In an attempt to cure this difficulty, it has been proposed to truncate the conical stylus tip, thereby permitting a reduction in the tip angle by as much as 14°, that is from 118° to 104°, and accordingly providing for a proportionate increase in the traction ability of the stylus in the record groove. Although this latter attempt results in bettering the tracking of the wide-angle tip on standard records, it fails to provide any substantial improvement in the tracking of the tip on microgroove records, because the truncation of the conical stylus tip decreases the surface area left for contact with the upper edge portions of the modulated groove of microgroove records.

It is the primary object of the invention to provide a reproducing stylus tip which can be satisfactorily used with either of two different types of records, and which will reproduce either type of record without objectionable distortions and will track both types of records equally well.

Other and more specific objects of the invention have to do with improvements in the construction and configuration of the stylus tip so as to assure adequate performance whether the stylus is used with a standard record or with a microgroove record.

A stylus tip constructed in accordance with the broader aspect of this invention, includes two record-groove engaging portions which are stepped with respect to each other and are so related in shape and size as to adapt the stylus tip for proper seating engagement with the groove of standard records or with the groove of microgroove records, and as not to interfere with each other when the stylus tip is used with one or the other type of record. According to a more specific aspect of the invention, the two mentioned portions of the stylus tip are generally conical and are provided with predetermined angles and radii best suited to assure good reproduction and satisfactory tracking of either type of record. In carrying out the invention, the stylus tip is provided with a main portion and a protuberant portion, the main or larger portion having the form of a shouldered or partially truncated cone, the protuberant or smaller portion having the form of a round-ended cone depending from said wide groove engaging portion.

The novel features of the invention together with the foregoing and other objects and advantages thereof, will be best understood from the following description of the practicable embodiments shown in the accompanying drawings in which.

Figure 1:
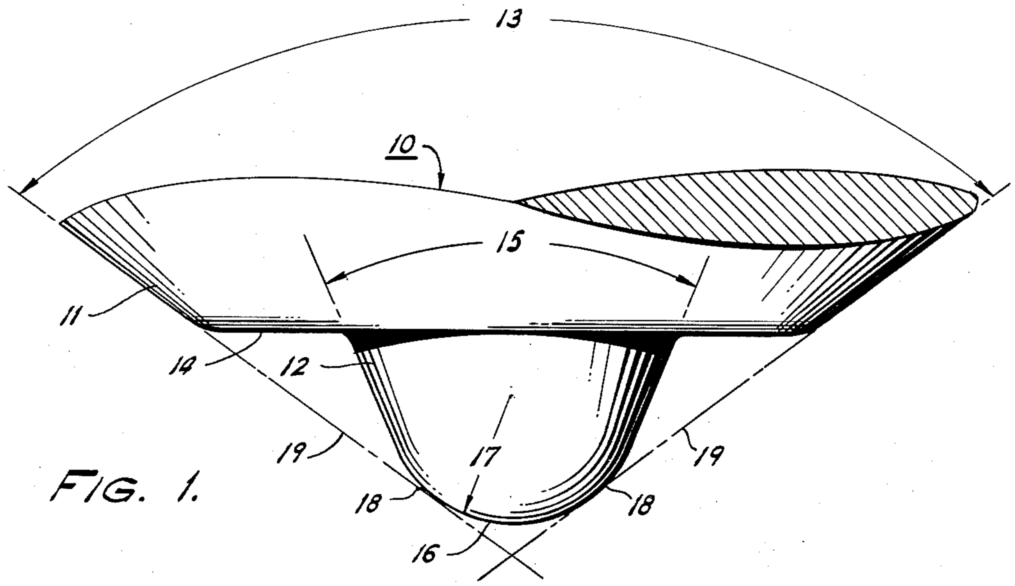
Figure 1 is a fragmentary elevational view illustrating, on a greatly enlarged scale, one form of stylus tip constructed in accordance with the invention.
Figure 4:
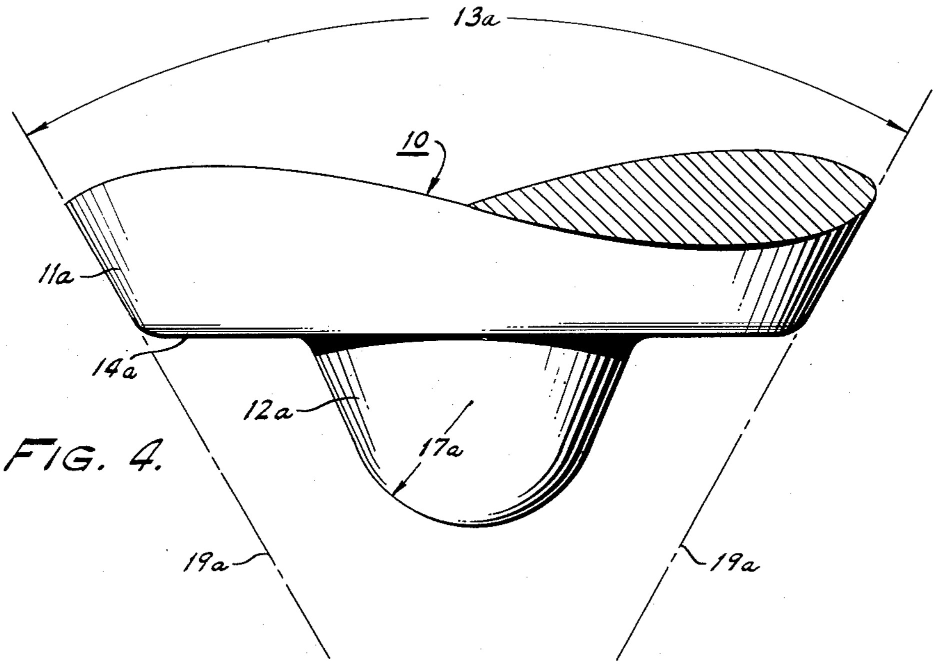
Figure 4 is a fragmentary elevational view, on a greatly enlarged scale, illustrating another form of stylus tip constructed in accordance with the invention.
Figure 7:
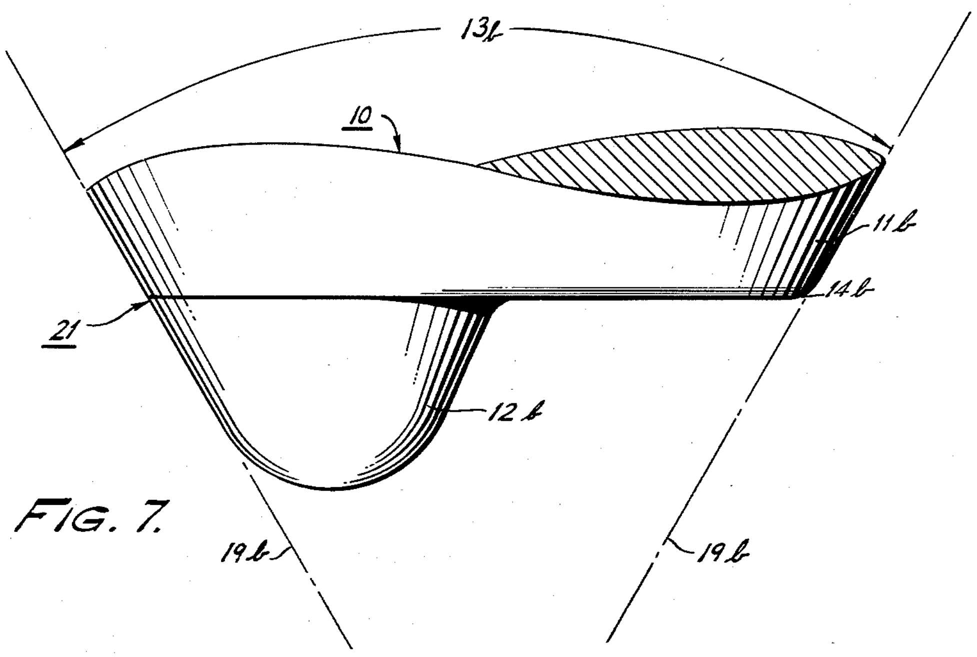
Figure 7 is a fragmentary elevational view, on a greatly exaggerated scale, illustrating still another form of stylus tip constructed in accordance with the invention.

Referring more particularly to the drawings, the stylus tip 10 as shown in several figures, comprises a main or larger portion and a protuberant or smaller portion, which portions are indicated, respectively, at 11 and 12 in Figure 1, at **11*a* and 12*a* in Figure 4, and at 11*b* and 12*b*** in Figure 7. These two portions are generally conical and have surfaces of predetermined angles and radii so as to provide for proper seating engagement of the stylus tip with either of the two hereinbefore mentioned types of records. In all of the various embodiments, it will be noted that the protuberant portion is included within the projection of the solid angle formed by the conical peripheral surface of the main portion. This relationship insures that when the stylus tip is used with a standard record having a groove of the hereinbefore stated conventional design, proper engagement of said main portion with the record groove is not affected by the presence of the protuberant portion. Also, it will be noted that the radius of the protuberant portion is such that when the stylus tip is used with a microgroove record, said protuberant portion so engages the walls of the groove as to prevent contact with the bottom of said groove. A significant factor which, in the several illustrated forms of the invention, insures proper operation of the stylus tip with either type of record, is that the length of the protuberant portion is shorter than the depth of the groove in standard records and longer than the depth of the groove in microgroove records. Because of this particular relationship, the protuberant portion is prevented from contacting the bottom of the groove when the stylus tip is used with a standard record, and said protuberant portion supports the main portion away from the face of a microgroove record when the stylus tip is used with such a record.

In the embodiments shown in Figures 1 and 4, the protuberant portion is disposed in substantially concentric relation with respect to the main portion, and the main portion is specially constructed and adapted for engagement with the groove of standard records, whereas the protuberant portion is specially constructed and adapted for engagement with the groove of microgroove records. In the embodiment shown in Figure 7, the protuberant portion is disposed eccentrically with respect to the main portion, and the two portions are contigous at one point of their circumferential surface so that both portions cooperate to provide for the seating of the stylus tip in the groove of standard records, while the protuberant portion alone serves serves to effect proper seating of the stylus tip in the groove of microgroove records.

With particular reference to the embodiment shown in Figure 1 which is on a scale approximately one thousand times larger than the actual size of the stylus tip, the main portion 11 takes the form of a cone having an included angle 13 of approximately 106° and terminating with a shouldered or partially truncated end 14. The protuberant portion 12 which is disposed concentrically with respect to the main portion and which extends from said end 14 of the main portion, consists of a cone having an included angle 15 of approximately 45° and terminating with a rounded end 16. This rounded end has a radius 17 of the order of 0.001 inch, which radius is tangent as indicated at 18, to imaginary lines 19 continuously projected from the conical surface of main portion 11.

Figure 2:
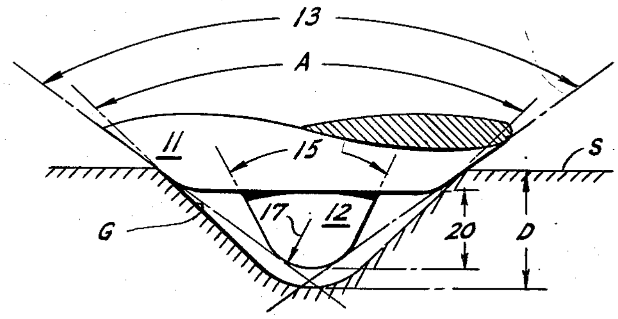
Figure 2 is an elevational-sectional view, on a smaller scale, showing the stylus tip illustrated in Figure 1, in relation to the groove of a standard record.

As seen in Figure 2, when the stylus tip is used with a standard record S, the conical main portion 11 engages the upper portion of the groove G of the standard record. The fact that included angle 13 of main portion 11 is greater than angle A formed by the slanted walls of said groove, the fact that angle 15 of protuberant portion 12 is smaller than said angle A, the fact that radius 17 of said protuberant portion is within the included angle 13 of the main portion, and the fact that the length 20 of said protuberant portion is shorter than the depth D of said groove, cooperate to insure maintenance of said protuberant portion away from the sides and bottom of the groove.

Figure 3:
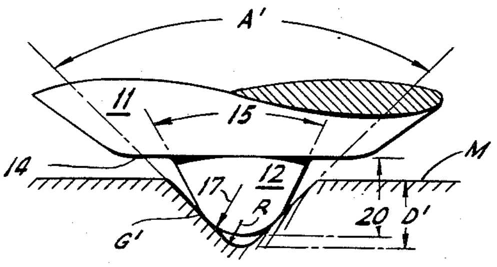
Figure 3 is a view similar to Figure 2, illustrating the relation of the tip with respect to the groove of a microgroove record.

As seen in Figure 3, when the stylus tip is used with a microgroove record M, the protuberant portion 12 seats itself within the groove G′ of the microgroove record. In this case, even though the included angle 15 of said protuberant portion is smaller than the angle A′ of the groove, the stylus tip rides the side walls of said groove without touching the bottom thereof because the radius 17 of said protuberant portion is greater than the radius R of the groove. It will be understood that because the length 20 of protuberant portion 12 is longer than the depth D′ of the groove G′, the shouldered or partially truncated end 14 of said main portion is effectively supported at a level sufficiently spaced from the playing surface of the record to prevent interfering engagement between said end of the main portion and said surface of the record.

As clearly appears from Figures 2 and 3, whether the stylus tip is used with a standard record or with a microgroove record, a substantial portion of the stylus tip extends well within the groove so that there is ample frictional engagement between the contacting surfaces of the record and stylus tip to insure good tracking and traction ability.

In the embodiment illustrated in Figure 4 which is also on a scale of about one thousand times larger than actual size, the construction of the stylus tip is generally the same as that shown in Figure 1, except that shouldered or partially truncated conical main portion **11*a* has an included angle 13*a* of approximately 70°. Because of this more acute angle, the main portion 11*a*** of the stylus tip can engage the groove G of a standard record S in the manner represented in Figure 5, that is, without contacting the extreme edges E of the groove. As a result, the operation of the stylus tip is not affected by burrs or like imperfections which, in some records, might be present along said edges.

Figures 5, 6:
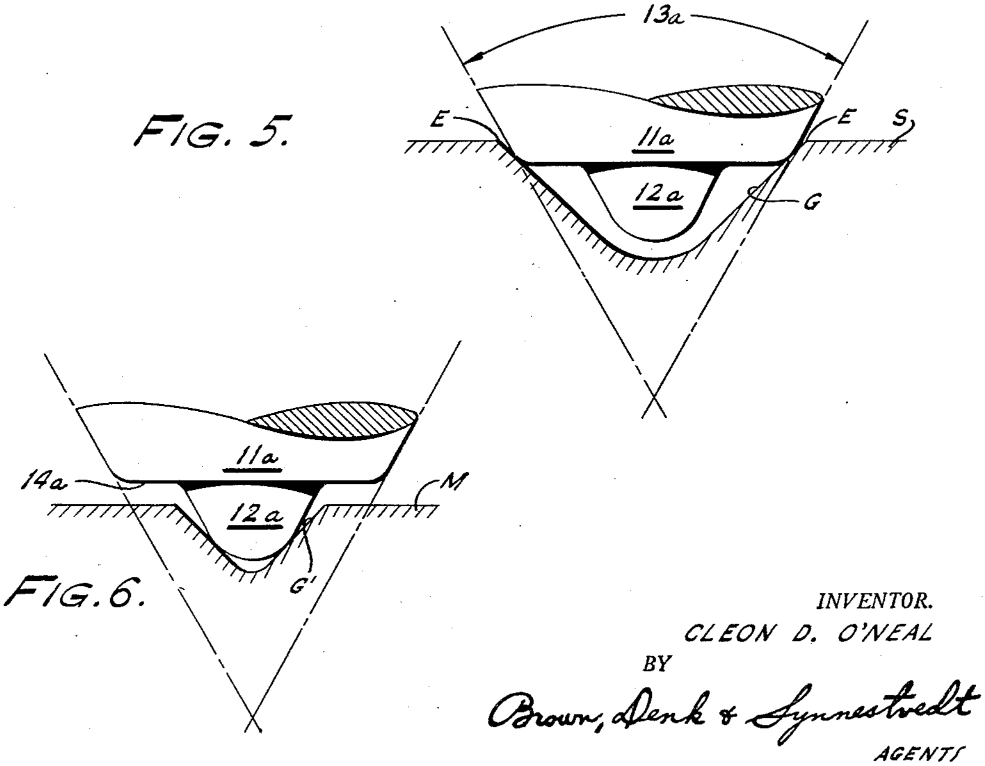
Figure 5 is an elevational-sectional view on a smaller scale, showing the stylus tip illustrated in Figure 4, in relation to the groove of a standard record.
Figure 6 is a view similar to Figure 5, illustrating the relation of the tip with respect to the groove of a microgroove record.

The manner in which a stylus having the form shown in Figure 4, cooperates with the groove G′ of a microgroove record M is shown in Figure 6. From this figure, it will be seen that protuberant portion **12*a*, like the portion 12 in Figure 3, seats itself well into the groove G′ and rides the side walls of said groove without touching the bottom thereof, and that shouldered or partially truncated end 14*a* of main portion 11*a*, like the end 14** in Figure 3, is positively supported in spaced relation with respect to the playing surface of the record so as not to interfere with proper seating of said protuberant portion.

It is to be noted that the radius 17a of protuberant portion 12a, as appears from Figure 4, is not tangent to projected imaginary lines 19a but that, nevertheless, this protuberant portion is within the angle defined by said lines and, therefore, within the angle 13a of main portion 11a.

In the embodiment illustrated in Figure 7, the construction of the stylus tip is essentially identical to that shown in Figure 4, the main difference being that the protuberant portion 12b is arranged eccentrically with respect to shouldered or partially truncated end 14b of main portion 11b, and that these two portions, at a point 21 of their circumferential surface, are contiguous.

Figures 8, 9:
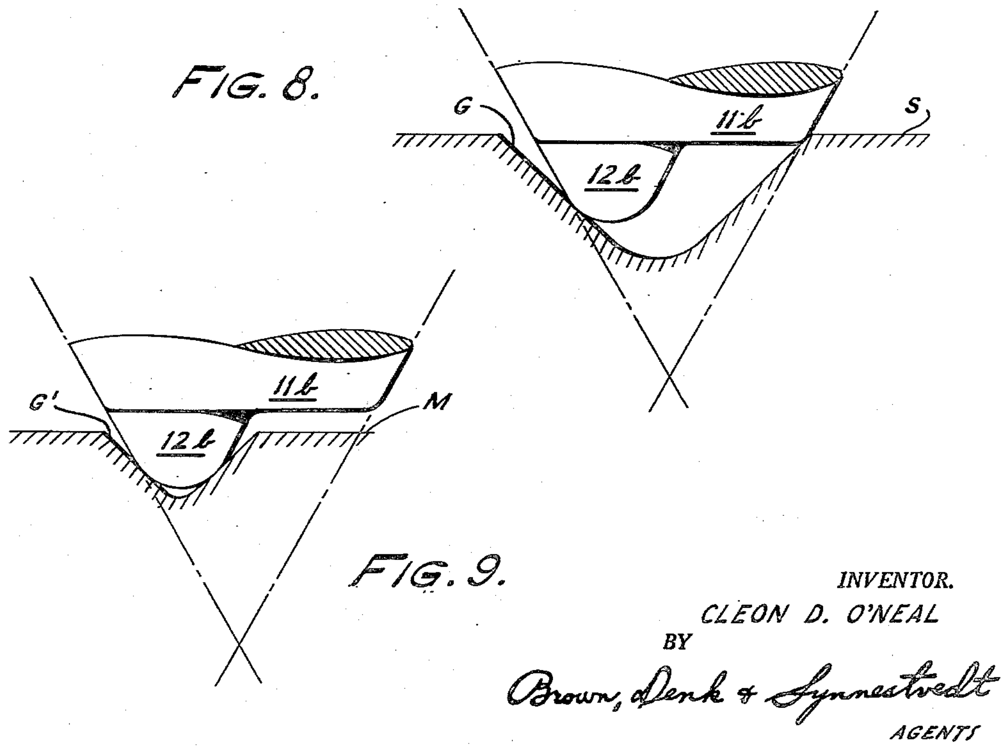
Figure 8 is an elevational-sectional view on a smaller scale, showing the stylus tip illustrated in Figure 7, and its relation to the groove of a standard record.
Figure 9 is a view similar to Figure 8, illustrating the relation of the tip with respect to the groove of a microgroove record.

As can be seen in Figure 8, the stylus tip having a form as shown in Figure 7, so engages the groove G of a standard record S that the protuberant portion 12b rides one wall of the groove and the shouldered or partially truncated main portion 11b rides the other wall of the groove. Because the stylus tip constantly tends to center itself in the groove, the eccentrically disposed protuberant portion 12a is effectively prevented from coming into contact with the bottom of the groove.

As appears in Figure 9, when the stylus tip constructed as shown in Figure 7 is used with a microgroove record M, the protuberant portion rides the opposite side walls of the groove G′ away from the bottom thereof and maintains the shouldered or partially truncated portion 11b off the playing surface of the record.

It will be noted that in the embodiment as shown in Figure 7, protuberant portion 12b is within the angle defined by projected imaginary lines 19b and that, therefore, said portion is within the angle 13b of main portion 11b.

From the foregoing description, it will be appreciated that the invention makes it possible to provide a stylus tip of predetermined contour which most suitably adapts the tip for indiscriminate use with either standard records or microgroove records. The fact that a stylus tip constructed in accordance with the invention includes two mutually related portions, each of which is so constructed as not to interfere with proper operation of the other when the stylus tip is used with either a standard record or a microgroove record, is most advantageous because it insures good performance regardless of which type of record is being played. Moreover, the fact that the two related operative portions of the stylus tip are provided with predetermined angles and radii, is of significant merit since it assures adequate and satisfactory tracking of either of the two mentioned types of records.

It will be understood that modifications may be made in the specific angles and radii herein given, without departing from the principles of the invention. For example, wider or narrower angles and larger or smaller radii may be used to adapt a stylus tip to grooves departing extensively from the generally accepted specifications. However, in such modifications the characteristic relationship between the main portion and the protuberant portion of the stylus tip will remain as herein described.

I claim:

1. A phonograph stylus tip for use in reproducing sound from either of two distinct types of records, one type being provided with a laterally modulated larger V-shaped groove having a width of the order of 0.006 inch at the surface of the record, a bottom radius of approximately 0.002 inch and a depth of about 0.0021 inch, the other type being provided with a laterally modulated smaller V-shaped groove having a width of the order of 0.003 inch at the surface of the record, a bottom radius of approximately 0.0002 inch and a depth of about 0.00125 inch, said stylus tip comprising a larger tip portion adapted to seat within and in engagement with said larger groove at a region near the top thereto, and a smaller tip portion depending from said larger tip portion and adapted to seat within and in engagement with said smaller groove at a region near the bottom thereof; said larger tip portion terminating in a shouldered end, the distance between diametrically opposite points at the marginal boundary of said end being greater than said width of said smaller groove at the surface of the record and less than said width of said larger groove at the surface of the record; said smaller tip portion extending substantially longitudinally from said shouldered end of said larger tip portion for a distance less than said depth of said larger groove to clear the bottom thereof when said larger tip portion is seated within said larger groove and in engagement with said region thereof, and for a distance greater than said depth of said smaller groove to support said larger tip portion with its said shouldered end spaced from the record surface when said smaller tip portion is seated within said smaller groove and in engagement with said region thereof, said smaller tip portion terminating with a rounded end, the radius of which is less than said bottom radius of said larger groove but greater than said bottom radius of said smaller groove to clear the bottom thereof.

2. A phonograph stylus tip for use in reproducing sound either from a record provided with a laterally modulated larger V-shaped groove, or from a record provided with a laterally modulated smaller V-shaped groove, said larger groove being wider and deeper and having a greater bottom radius than said smaller groove, said stylus tip comprising a larger tip portion adapted to seat within and in engagement with said larger groove at a region near the top thereof, and a smaller tip portion depending from said larger tip portion and adapted to seat within and in engagement with said smaller groove at a region near the bottom thereof; said larger tip portion terminating in a shouldered end, the distance between diametrically opposite points at the marginal boundary of said end being greater than the width of said smaller groove at the surface of the record but less than the width of said larger groove at the surface of the record; said smaller tip portion extending substantially longitudinally from said shouldered end of said larger tip portion for a distance less than the depth of said larger groove to clear the bottom thereof when said larger tip portion is seated within said larger groove and in engagement with said region thereof, and for a distance greater than the depth of said smaller groove to support said larger tip portion with its said shouldered end spaced from the record surface when said smaller tip portion is seated within said smaller groove and in engagement with said region thereof, said smaller tip portion terminating with a rounded end, the radius of which is less than the bottom radius of said larger groove but greater than the bottom radius of said smaller groove to clear the bottom thereof.

3. A phonograph stylus comprising a cone-shaped tip for use in reproducing sound either from a record provided with a laterally modulated larger V-shaped groove, or from a record provided with a laterally modulated smaller V-shaped groove, said larger groove being wider and deeper and having a greater bottom radius than said smaller groove, a shoulder disposed crosswise of said stylus where the distance between diametrically opposite points is greater than the width of said smaller groove at the surface of the record but less than the width of said larger grove at the surface of the record, and where the distance between said shoulder and the apex end of said cone-shaped tip is less than the depth of said larger groove but greater than the depth of said smaller groove, said apex end of said cone-shaped tip being rounded on an arc the radius of which is less than the bottom radius of said larger groove but greater than the bottom radius of said smaller groove.

4. A phonograph stylus comprising a cone-shaped tip as set forth in claim 3, in which the portions on either side of the plane of the mentioned shoulder are concentrically disposed.

5. A phonograph stylus comprising a cone-shaped tip as set forth in claim 3, in which the portions on either side of the plane of the mentioned shoulder are eccentrically disposed.

6. A phonograph stylus comprising a cone-shaped tip as set forth in claim 3, in which the portions on either side of the plane of the mentioned shoulder are eccentrically disposed and are contiguous at one point of their circumferential surface.

7. An all purpose needle for pick up heads of sound reproducing machines providing low distortion reproduction with two points of contact with standard and micro grooves, comprising a tip member having a pair of groove engaging portions, presented as a first portion and a second portion, respectively, coaxially disposed and distinct one from the other; each of said portions having its outer face in the form of a surface of revolution; the first portion being carried by the second portion at the extreme end of the tip member and being inwardly stepped therefrom to provide a downwardly facing shoulder between said portions at the lower end of the second portion; said shoulder extending radially between and being concentric with said portions; the first portion being of relatively small dimensions to enter into a micro groove to the exclusion of the second portion, and to contact the side walls of the micro groove at two points between the top and bottom of the groove; the second portion being of relatively large dimensions to enter into a standard and larger groove together with the first portion and to contact the side walls of the standard groove at two points, exclusive of any contact by the first portion with the side walls of the standard groove.

8. An all purpose needle for pick-up heads of sound reproducing machines providing low distortion reproduction with two points of contact with standard and micro grooves, comprising a tip member having a pair of groove engaging portions, presented as a first portion and a second portion, respectively, and distinct one from the other; the first portion being carried by the second portion at the extreme end of the tip member and being inwardly stepped therefrom to provide a downwardly facing shoulder between said portions at the lower end of the second portion; said shoulder extending radially between said portions; the first portion being of relatively small dimensions to enter into a micro groove to the exclusion of the second portion, and to contact the side walls of the micro groove at two points between the top and bottom of the groove; the second portion being of relatively large dimensions to enter into a standard and larger groove together with the first portion and to contact the side walls of the standard groove at two points, exclusive of any contact by the first portion with the side walls of the standard groove.

9. An all purpose needle as set forth in claim 8, in which each of the two mentioned portions has its outer face in the form of a surface of revolution.

10. An all purpose needle as set forth in claim 8, in which the two mentioned portions are coaxially disposed, and the mentioned shoulder is concentric with said portions.

11. An all purpose needle for pick-up heads of sound reproducing machines providing low distortion reproduction with two points of contact with standard and micro grooves, comprising a tip member having a pair of groove-engaging portions presented as a first portion and a second portion, respectively, and distinct one from the other, the first portion being carried by the second portion at the extreme end of the tip member and being inwardly stepped therefrom to provide a shoulder between said portions at the terminal end of the second portion, said shoulder extending radially between said portions, the first portion being of relatively small dimensions to enter into a micro groove to the exclusion of the second portion and to contact the side walls of the micro groove at two points between the top and bottom of the groove, the second portion being of relaively large dimensions to enter into a standard and larger groove together with the first portion and to contact the side walls of the standard groove, at two points, exclusive of any contact by the first portion with the side walls of the standard groove.

References Cited in the file of this patent

UNITED STATES PATENTS

| | | |
|---|---|---|
| 1,012,910 | Porter | Dec. 26, 1911 |
| 1,425,458 | Edison | Aug. 8, 1922 |
| 2,328,889 | Capps | Sept. 7, 1943 |
| 2,573,723 | McClain | Nov. 6, 1951 |